US011050197B1

(12) United States Patent
Higgins et al.

(10) Patent No.: US 11,050,197 B1
(45) Date of Patent: Jun. 29, 2021

(54) REVERSIBLE CONNECTOR ORIENTATION DETECTION IN AN ELECTROMAGNETIC TRACKING SYSTEM

(71) Applicant: ALKEN Inc., Colchester, VT (US)

(72) Inventors: Robert F. Higgins, South Burlington, VT (US); Henry E. Himberg, Williston, VT (US); Keith M. Hanf, Colchester, VT (US)

(73) Assignee: ALKEN Inc., Colchester, VT (US)

( * ) Notice: Subject to any disclaimer, the term of this patent is extended or adjusted under 35 U.S.C. 154(b) by 0 days.

(21) Appl. No.: 16/773,396

(22) Filed: Jan. 27, 2020

Related U.S. Application Data

(60) Provisional application No. 62/797,253, filed on Jan. 26, 2019.

(51) Int. Cl.
| | | |
|---|---|---|
| *G01B 7/004* | (2006.01) | |
| *G06F 3/00* | (2006.01) | |
| *H01R 13/66* | (2006.01) | |
| *H01R 13/64* | (2006.01) | |

(52) U.S. Cl.
CPC ......... *H01R 13/6683* (2013.01); *G01B 7/004* (2013.01); *G06F 3/00* (2013.01); *H01R 13/64* (2013.01); *H01R 2201/20* (2013.01)

(58) Field of Classification Search
CPC .... H01R 13/6683; H01R 13/64; G01B 7/004; G06F 3/00; G06F 13/4081; G06F 13/20; G06F 13/10
See application file for complete search history.

(56) References Cited

U.S. PATENT DOCUMENTS

| | | | | |
|---|---|---|---|---|
| 6,528,989 B1 * | 3/2003 | Hansen | ................... | G01B 7/003 324/207.12 |
| 8,121,812 B2 | 2/2012 | Higgins | | |
| 8,427,296 B2 * | 4/2013 | Pance | ................. | G06F 13/4068 340/505 |
| 8,882,524 B2 * | 11/2014 | Golko | ................ | H01R 13/6273 439/218 |
| 9,350,125 B2 * | 5/2016 | Jones | ..................... | H01R 12/81 |
| 9,367,490 B2 * | 6/2016 | Huang | .................... | G06F 13/10 |
| 9,477,625 B2 | 10/2016 | Huang et al. | | |
| 9,515,420 B2 * | 12/2016 | Daoura | ................ | H01R 13/642 |
| 9,785,227 B2 * | 10/2017 | Lee | .......................... | G06F 1/26 |
| 10,187,727 B2 | 1/2019 | Rand et al. | | |
| 10,866,012 B2 * | 12/2020 | Kvasnicka | .............. | E04F 13/18 |

* cited by examiner

*Primary Examiner* — Vanessa Girardi
(74) *Attorney, Agent, or Firm* — Lerner, David, Littenberg, Krumholz & Mentlik, LLP

(57) ABSTRACT

An apparatus and method for implementing a reversible connector for receiving coil-based sensor signals in an electromagnetic or hybrid tracking system. The apparatus is designed to reduce the number of connector pins assigned to the coil-based sensor signals while maintaining signal quality.

20 Claims, 4 Drawing Sheets

Known & Possible Connections

| | | |
|---|---|---|
| A2 | Known | X-axis |
| B2 | Known | X-axis |
| A11 | Unknown | Y-axis or Z-axis |
| B11 | Unknown | Z-axis or Y-axis |

REVERSIBLE CONNECTOR ORIENTATION DETECTION IN AN ELECTROMAGNETIC TRACKING SYSTEM

CROSS-REFERENCE TO RELATED APPLICATIONS

The present application claims the benefit of the filing date of U.S. Provisional Patent Application No. 62/797,253 filed Jan. 26, 2019, the disclosure of which is hereby incorporated herein by reference

TECHNICAL FIELD

The present disclosure generally relates to electromagnetic tracking systems.

BACKGROUND

Electromagnetic tracking systems use electromagnetic field emitters and sensors to determine position and/or orientation (PnO) of a tracked object. In hybrid tracking systems, other technologies such as gyroscopes, accelerometers, magnetometers, barometers and others, can be combined with the electromagnetic sensors in order to improve the PnO determinations. The electromagnetic and other sensors communicate signals to a processing device included in the system electronics.

Typically, the emitters are positioned in a fixed location having a known reference frame. In a standard six degree of freedom (6-DOF) electromagnetic tracking system, the known location may include each of three defined spatial axes, such as orthogonal X, Y, and Z axes, as well as three defined rotational axes, such as roll, pitch and azimuth axes, whereby roll is defined as a rotation about the X axis, pitch is defined as rotation about the Y axis, and azimuth is defined as a rotation about the Z axis. The PnO of the sensors, are then calculated relative to the known reference frame. In the 6-DOF system, the PnO may include X, Y and Z axis displacements between the source (e.g., emitters) and sensors, as well as rotational differences in each of the roll, pitch and azimuth angles of rotation.

In tracking systems using an analog interface between the sensors and system electronics, the sensor signals are commonly a low level analog voltage which must be carefully amplified before sampling. Similar care must be taken for systems using a digital interface due to the sensor signals commonly having high data rates. Interconnections require strict attention during printed circuit board (PCB) design in order to avoid cross coupling between sensor signals and noise pickup in the interface. To process the signals correctly, it is necessary to know the identity of each incoming signal, as well as the polarity of the signals if differential signals are used. The need for knowledge of the identity of the incoming signals has traditionally required the use of polarized connectors that require the user to connect the sensors with the electronics unit in a known circuit configuration. This limits the size and type of connector systems that can be used in the interface.

Modern connector systems, such as USB Type-C connectors, provide a high performance interconnection that take up a small space, which is desirable. However, the connectors are often reversible, which means that the connector may be installed with either 0 or 180 degrees of rotation. The reversible nature of this connector is problematic in the present tracking systems in that each pin in the sensor cable may connect to one of two different pins on the connection port of the system electronics.

One solution to this problem is to "mirror" the pins of the sensor cable such that the pin arrangement has a 180 degree, or second order, rotational symmetry. This would guarantee that each pin of the connection port of the system electronics would receive the same sensor signal, regardless of the orientation of the connector. However, "mirroring" the connector pins requires duplicating each signal transmitted by the cable, which essentially halves the number of usable pins in the connector. additionally, "mirroring" required a more complicated arrangement for connecting each of the cable pins to the correct signals, which significantly increases the complexity of the PCB design.

An alternative to "mirroring" all of the pins is to incorporate a physical switching circuit into the design that allows the system to re-configure the interconnection based on sensing the connector insertion polarity. However, this approach requires additional circuitry that uses valuable board space, increases complexity, adds cost, and reduces reliability of the connection electronics.

SUMMARY

An aspect of the disclosure is directed to an apparatus including a port configured to receive a reversible connector comprising a plurality of pins, the port including a plurality of electrical connection points adapted to receive the plurality of pins of the reversible connector in either one of a first orientation or a second orientation, and a processor configured to receive electrical signals from the connection points of the port. In a first orientation, a first connection point is adapted to receive a first pin, a second connection point is adapted to receive a second pin, a third connection point is adapted to receive a third pin, and a fourth connection point is adapted to receive a fourth pin. In a second orientation, the first connection point is adapted to receive the second pin, the second connection point is adapted to receive the first pin, the third connection point is adapted to receive the fourth pin, and the fourth connection point is adapted to receive the third pin. The received electrical signals include a first electrical signal received from the first and second pins, the first electrical signal indicating a magnetic field sensed by a receiving sensor array along a first axis, a second electrical signal received from the third pin, the second electrical signal indicating a magnetic field sensed by the receiving sensor array along a second axis, and a third electrical signal received from the fourth pin, the third electrical signal indicating a magnetic field sensed by the receiving sensor array along a third axis. The processor is further configured to determine whether the reversible connector is in the first orientation or the second orientation based on the received first, second and third electrical signals.

In some examples, the receiving sensor array may be configured to detect a magnetic field from a transmitting coil array to derive a set of components of the magnetic field generated by the transmitting coil array, and the processor may be configured to form a matrix of the set of components derived from the magnetic field based on the received first, second and third electrical signals, calculate a determinant of the matrix, and determine whether the reversible connector is in the first orientation or the second orientation based on whether the determinant is positive or negative. The processor may be configured to assign data received at the third and fourth connection points based on the determination of whether the reversible connector is in the first orientation or the second orientation. The processor may be configured to assign data received at additional connections points of the port based on the determination of whether the reversible connector is in the first orientation or the second orientation. The assigned data received at the additional connections may include one or more of: acoustic signal data; gyroscope signal data; optical signal data; accelerometer signal data; barometer signal data; or magnetometer signal data.

In some examples, the electrical signals received at the connection points of the port may be analog signals, and the apparatus may include one or more amplifiers configured to amplify the electrical signals. In other examples, the electrical signals received at the connection points of the port may be digital signals.

Another aspect of the disclosure is directed to an electromagnetic tracking system including a transmitter including a plurality of transmitter coils and an actuating circuit configured to actuate the transmit coils at different times or at different frequencies, a receiver including a plurality of receiver coils, each receiver coil configured to receive a respective component of a magnetic field generated by each of the transmitter coils, and to generate a plurality of respective electrical signals corresponding to each received component of the magnetic field, a processor configured to determine each of a position and an orientation of the receiver relative to the transmitter based on an analysis of the plurality of electrical signals generated by the receiver, and a wired connection configured to deliver the plurality of electrical signals from the receiver to the processor. The wired connection may include a reversible connector. The processor may be configured to determine an orientation of the reversible connector based on the analysis of the plurality of electrical signals.

In some examples, the processor may be configured to form a matrix of the plurality of respective electrical signals, calculate a determinant of the matrix, and determine the orientation of the reversible connector based on the determinant of the matrix. The processor may be configured to, for first and second pins of the reversible connector having second order rotational symmetry with one another, assign a row or column of the matrix to the first pin and a second row or column of the matrix to the second pin, if the determinant of the matrix is positive, maintain the assigned rows or columns of the first and second pins, and if the determinant of the matrix is negative, switch the assigned rows or columns of the first and second pins with one another. The processor may be configured to for third and fourth pins of the reversible connector having second order rotational symmetry with one another, assign a first data type to the third pin and a second data type to the second pin, if the determinant of the matrix is positive, maintain the assigned data types of the third and fourth pins, and if the determinant of the matrix is negative, switch the assigned data types of the third and fourth pins with one another. The first data type and the second data type may be different ones of: acoustic signal data; gyroscope signal data; optical signal data; accelerometer signal data; barometer signal data; or magnetometer signal data.

In some examples, the plurality of respective electrical signals may be analog signals, and the electromagnetic tracking system may include one or more amplifiers configured to amplify the plurality of respective electrical signals. The system may include an analog to digital converter configured to convert the analog signals to digital signals. The processor may be configured to analyze the digital signals.

In some examples, the reversible connector may have a second order rotational symmetry. For instance, the reversible connector may be a USB-C connector.

Yet another aspect of the disclosure is directed to a system including an electromagnetic tracking system as described in any of the embodiments herein, and an object attached to one of the transmitter or the receiver of the electromagnetic tracking system. The electromagnetic tracking system may be configured to track a position and orientation of the object. In some examples, the object may be one of a handheld device, a wearable device, or a head mounted display.

Yet a further aspect of the disclosure is directed to a method for determining an orientation a reversible connector comprising a plurality of pins. First and second pins of the reversible connector are mirrored to one another and are configured to transmit a same first signal. Third and fourth pins of the reversible connector are mirrored to one another and are configured to transmit a second signal and a third signal, respectively. Each of the first, second and third signals indicate properties of a magnetic field sensed by a receiving sensor array along respective axes. The method may include receiving, at a processor, the first, second and third signals, and determining, at the processor, the orientation of the reversible connector based on an analysis of the first, second and third signals.

In some examples, the method may further include assigning, at the processor, respective axes to each of the second and third signals based on the determined orientation of the reversible connector. In some examples, the method may further include assigning, at the processor, signal data types to data received from other pins of the reversible connector based on the determined orientation of the reversible connector.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

FIG. 3 is a chart showing an example known and possible assignments for the pins of a connection port connected to the reversible connector of the system of FIG. 1.

DETAILED DESCRIPTION

Figure 1:
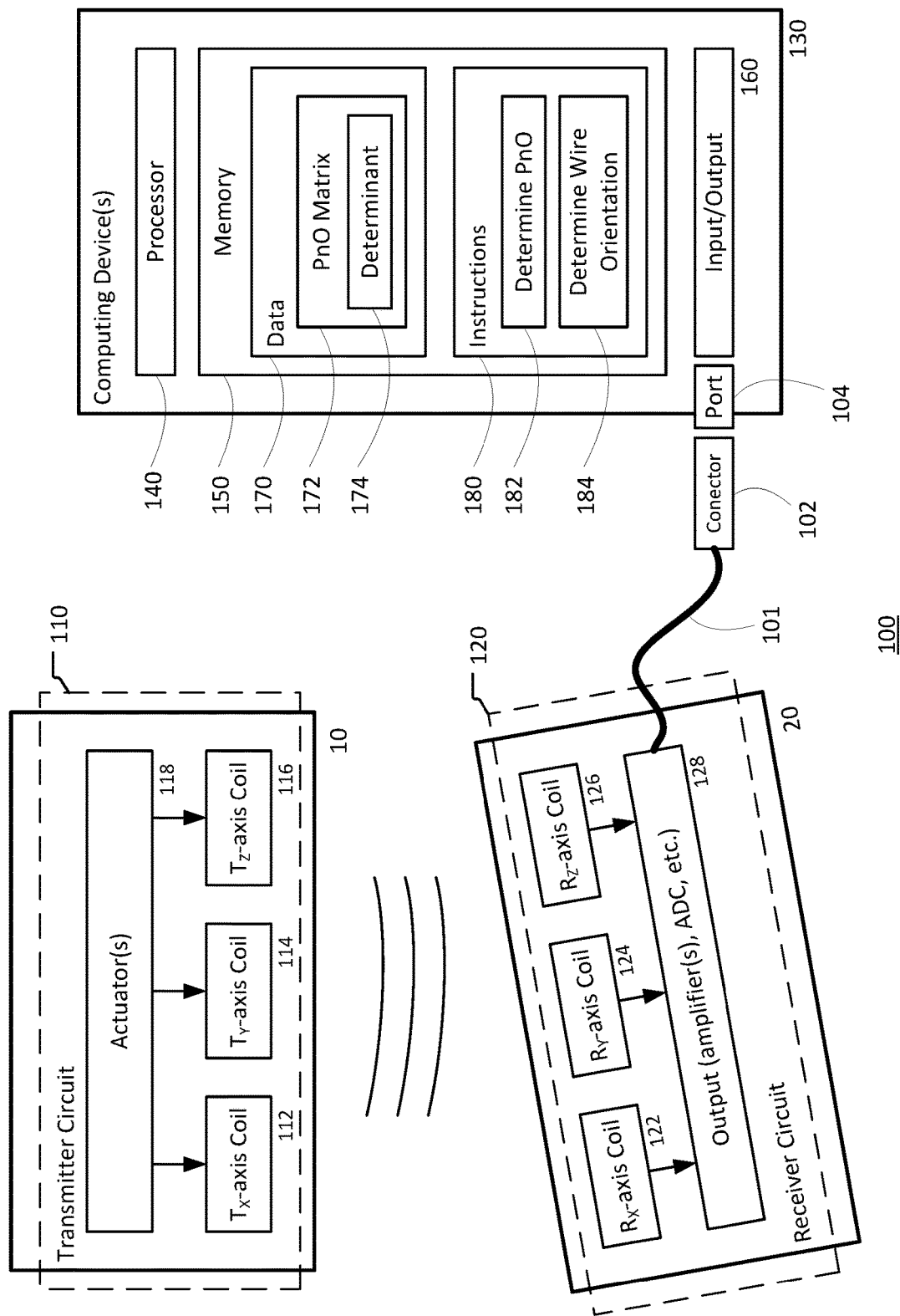
FIG. 1 is a block diagram of an electromagnetic tracking system in accordance with an embodiment of the present disclosure.

FIG. 1 is a block diagram illustrating an electromagnetic tracking system 100. The system 100 may include a wired connection 101 having a reversible connector 102 for connection to a connection port 104 of the system electronics. Additional details regarding the reversible connector are described in connection with FIGS. 2 and 3 below.

The system 100 further includes a transmitter circuit 110 for generating an electromagnetic field (also referred to herein as a magnetic field), a receiver circuit 120 for sensing the generated electromagnetic field and generating electrical signals based on the sensed electromagnetic field, and one or more computing devices 130 included in the system electronics for receiving and processing the electrical signals generated by the receiver circuit 120.

In the example of FIG. 1, the transmitter circuit 110 includes a transmitter coil array having a plurality of transmitter coils 112, 114, 116 aligned along X, Y, and Z axes of the transmitter, respectively. In FIG. 1, these axes are denoted $T_X$, $T_Y$ and $T_Z$. The X, Y and Z axes may be orthogonal to one another, or they may be different from one another without being orthogonal. Generally, the axes form a three-dimensional coordinate system (e.g., do not all extend within a common plane). The transmitter circuit 110 may further include an actuating circuit 118 configured to actuate the transmit coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. Driving the coils may result in an electromagnetic field being generated by the coils.

The receiver circuit 120 includes a receiving coil array having a plurality of receiver coils 122, 124, 126 aligned along X, Y, and Z axes of the receiver circuit, respectively. In FIG. 1, these axes are denoted $R_X$, $R_Y$ and $R_Z$. As with the transmitter axes, the X, Y and Z axes of the receiver circuit 120 may be orthogonal to one another, or may be different from one another without being orthogonal. Generally, the axes form a three-dimensional coordinate system (e.g., do not all extend within a common plane). Since the receiver circuit and transmitter circuit are capable of being oriented independent of one another, it should be understood that the X, Y and Z axes of one circuit are not necessarily aligned with the X, Y and Z axes of the other circuit. The electromagnetic field generated by the transmitter circuit 110 may cause an alternating electric current to be generated in the windings of the receiver coils 122, 124, 126. In the case of a time-division based transmission, the timing of the electric currents may indicate which of the transmitter coils 112, 114, 116 generated the electromagnetic field that resulted in the electric current. In the case of a frequency-division based transmission, a frequency of the alternating electric current may indicate which of the transmitter coils 112, 114, 116 is responsible. In this fashion, each of the receiving coils in the receiving coil array may derive a set of components of the electromagnetic field, whereby each component of the set is generated by a different transmitter coil of the transmitting coil array.

The receiver circuit 120 may further include an output circuit 128 for receiving the generated electric currents and providing the currents as electrical signals to an external device, such as to computing device(s) 130, via cable 101. The cable 101 may be a USB Type-C connector, or any other second order rotationally symmetrical multi-pin cable known in the art.

The one or more computing devices 130 of the system electronics may include a processor 140, memory 150, and other components typically present in general purpose computers. The computing devices 130 may further include one or more input/output connections for sending and receiving electrical signals, such as the communication port 104 for receiving electrical signals from the reversible cable 101. The communication port 104 may be adapted to receive a connector 102 at an end of the cable 101, whereby pins of the communication port 104 may be aligned with the pins included in the connector 102.

The processor 140 may be a well-known processor or other lesser-known types of processors. Alternatively, the processor 140 can be a dedicated controller such as an ASIC. The memory 150 can store information accessible by the processor 140, including data 170 that can be retrieved, manipulated or stored by the processor 140, in accordance with instructions 180 stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data 170 may be stored in computer registers, in a data store as a structure having a plurality of different fields and records, or documents, or buffers. The data 170 may also be formatted in a computer-readable format such as, but not limited to, binary values, ASCII or Unicode. Moreover, the data 170 can include information sufficient to identify relevant information, such as numbers, descriptive text, proprietary codes, pointers, references to data stored in other memories, including other network locations, or information that is used by a function to calculate relevant data. The instructions 180 may be a set of instructions executed directly, such as machine code, or indirectly, such as scripts, by the processor 140. In this regard, the terms "instructions," "steps," "programs" and "routines" can be used interchangeably herein. The instructions 180 can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

In the example of FIG. 1, the data 170 may include information for determining a position and orientation of the receiver circuit 120 relative to the transmitter circuit 110 or vice versa. For example, the data may include a signal matrix 172 from which the position and orientation (PnO) may be determined. The values included in the matrix 172 may be representations of the raw magnetic field data sensed by the receiver coils 122, 124, 126, including a magnitude and polarity of the magnetic field sensed from each one of the transmitter coils 112, 114, 116 of the transmitter circuit 110.

In the example of FIG. 1, in which three transmitter coils generate an electromagnetic field sensed by three receiver coils, the matrix may be a 3×3 matrix, whereby each component of the matrix may correspond to a different transmitter-receiver coil pair. Table 1 shows an example matrix:

TABLE 1

| $T_X R_X$ | $T_X R_Y$ | $T_X R_Z$ |
| $T_Y R_X$ | $T_Y R_Y$ | $T_Y R_Z$ |
| $T_Z R_X$ | $T_Z R_Y$ | $T_Z R_Z$ | whereby "$T_X R_X$" denotes a component of the electromagnetic field generated by the X-axis transmitter coil 112 and sensed by the X-axis receiver coil 122, "$T_X R_Y$" denotes a component of the electromagnetic field generated by the X-axis transmitter coil 112 and sensed by the Y-axis receiver coil 124, and so on. In other example configurations, N transmitter coils may be used, and N receiver coils may be used, whereby N is a value of two or more and may or may not be equal to three. In such configurations, an N×N matrix 172 may be included in the data 170. It should be recognized that if N=2, it may be not be possible to solve for more than four variables using the matrix, such that either position or orientation of the receiver circuit—but not both—may be determined based on the matrix, and additional sensor information may be required to provide a complete PnO determination. The data 170 may further include a determinant 174 of the 3×3 (or N×N) matrix. The determinant 174 may be calculated may be calculated based on the components of the matrix 172.

The instructions 180 may include instructions for determining a position and/or orientation 182 of the receiver circuit 120 relative to the transmitter circuit 110 based on the data 170. In some examples, the determination may be based solely on the electrical signals generated by the receiver coils 122, 124, 126. In other examples, the determination may be based on other signals received from other sensors included in the system 100. The instructions 180 may further include instructions for determining an orientation of the cable 101 based on the data 170. As explained below in connection with FIG. 4, the determinant 174 may be used to determine an orientation of the reversible cable 101.

Figure 2:
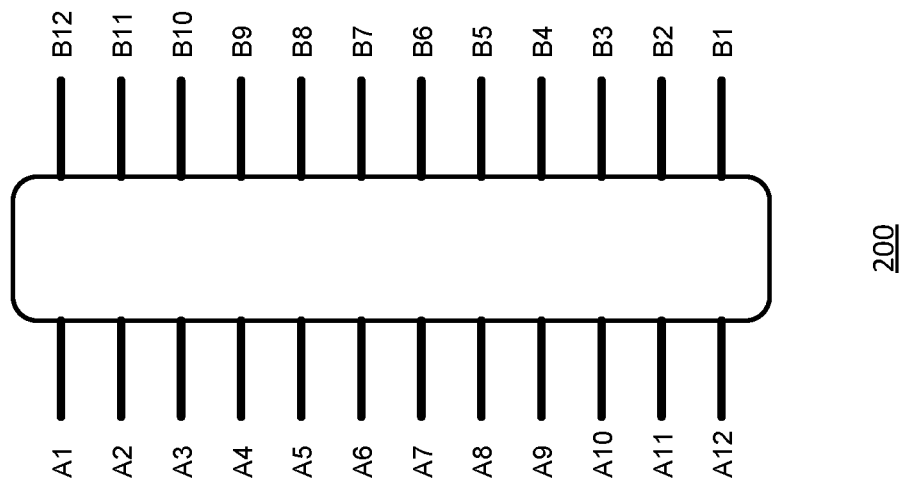
FIG. 2 is a pin diagram of an example reversible connector included in the system of FIG. 1.

FIG. 2 shows a pin diagram of an example reversible connector 200, such as connector 102 included with the cable 101 in the system 100 of FIG. 1. The example connector 200 includes twenty-four pins (A1-A12 and B1-B12) arranged with a 180 degree or second order rotational symmetry. Each pin of the computing device connection port may receive a corresponding pin of the connector 200. Reversing the connector causes the A pins to switch with the B pins. Stated another way, if in a first orientation of the connector 200 a given pin of the connection port receives pin A1 of the connector 200, then in the reversed second orientation of the connector 200 the given pin of the connection port would receive pin B1 of the connector 200. Similarly, if in a first orientation of the connector 200 a given pin of the connection port receives pin A2 of the connector 200, then in the reversed second orientation of the connector 200 the given pin of the connection port would receive pin B2 of the connector 200. And so on for each pair of pins in the connector A3-B3, A4-B4, A5-B5 and so on.

Each of the pins A1-A12 and B1-B12 of the connector may be wired to receive a specific signal from the output 128. However, the signals received at the pins of the connection port may not be known, since this may depend on the orientation of the connector 200.

FIG. 3 shows assignment of electrical signals from the output 128 to pins of the connector, in the form of a table 300. The chosen assignments are chosen in a manner that makes it possible for the processing circuitry at the computing device 130 to determine an orientation of the connector. Specifically, the connector receives each of a first electrical signal (e.g., from the X-axis receiver coil) at each of a first pins (e.g., A2) and a second pin (e.g., B2) that are rotationally symmetrical with one another, a second electrical signal (e.g., from one of the Y-axis receiver coil or the Z-axis receiver coil) at a third pin (e.g., A11), and a third electrical signal (from the other of the Y-axis receiver coil or the Z-axis receiver coil) at a fourth pin (e.g., B11) that is rotationally symmetrical with the third pin.

With respect to the first electrical signal, this signal is "mirrored" between the two sides (A and B) of the connector, such that the pins of the connection port receiving this data does not change depending on the orientation of the connector. Thus, the first electrical signal is known to the processing circuitry without determining the orientation of the connector.

Conversely, with respect to the second and third electrical signals, these signals are mirrored with one another, but it is not known to the processing circuitry which signal is which, and by extension which pin of the connection port receives which signal, without determining the orientation of the connector.

Figure 4:
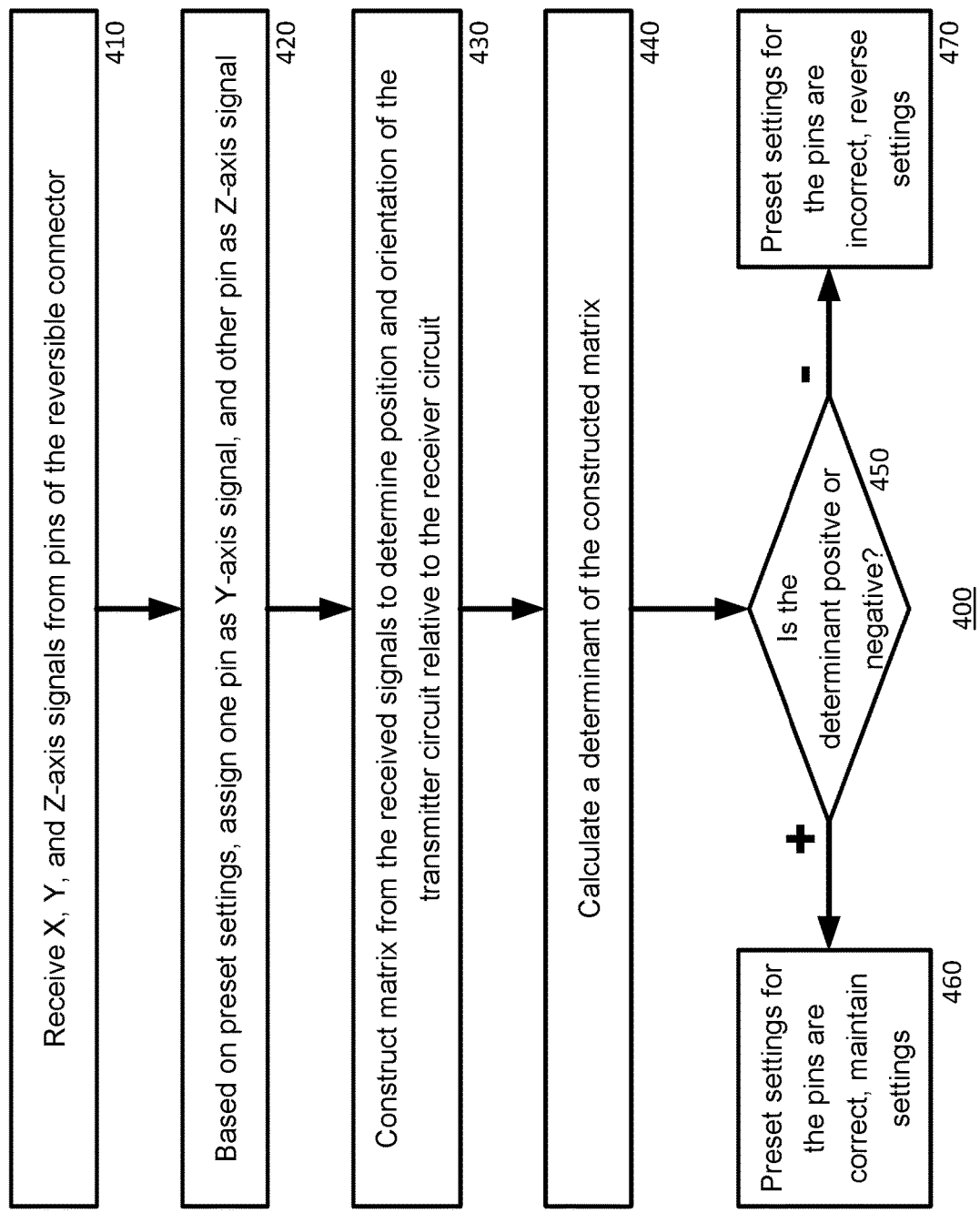
FIG. 4 is a flow diagram of an example routine in accordance with an embodiment of the present disclosure.

FIG. 4 is a flow diagram showing an example routine 400 for determining an orientation of the connector based on the electrical signals received. For purposes of the example of FIG. 4, the pin arrangement of FIG. 3 is assumed, although other pin arrangements may be used, so long as one of the electrical signals is mirrored with itself, and the other two signals are mirrored with each other, as in the example of FIG. 3. The operations in the routine may be carried out by the computing device(s) of the system electronics. It should be understood that in other examples, steps may be added, subtracted, replaced or reordered in the routine 400.

At block 410, the X-axis, Y-axis and Z-axis signals may be received from the pins of the reversible connector. As noted above, one of the signals, such as the X-axis signal, may be known, while it may be unknown which of the other two signals, such as the Y-axis and Z-axis signals, is which. In order to proceed with determining a position and orientation of the receiver circuit relative to the transmitter circuit, the computing device(s) may initially assume or assign an identity of the unknown pins. At block 420, this is done using a preset setting, which may be stored in the data of the memory of the computing device(s).

At block 430, a matrix is constructed from the electric signals received from the pins associated with the receiver coils of the electromagnetic tracking system. Construction of the matrix may be based on the preset assumptions or assignments defined at block 420.

At block 440, a determinant of the constructed matrix is calculated. The determinant may be either positive or negative, depending on whether the matrix has been constructed correctly, or whether components of the matrix should be swapped with one another. At block 450, it is determined whether the determinant is positive or negative. If the determinant is positive, then at block 460, operations proceed without any changes, as the positive determinant indicates that the preset configuration at block 420 was correct and does not need to be changed. Conversely, if the determinant is negative, then at block 470, operations proceed to reverse the assigned identities for the connection port pins receiving the unknown signals (e.g., the Y-axis and Z-axis signals in the example of FIG. 3), as the negative determinant indicates that the preset configuration at block 420 was incorrect and needed to be reversed. Reversing the pin assignments causes the determinant to switch from a negative value to a positive value.

The above examples are applicable to both analog and digital reversible wire connections between the receiver circuit and the processing circuitry of the computing device (s). In the example of a wire connector providing analog signals, the data received at the computing device may be the raw electromagnetic field data, which may be processed to determine the values for constructing the signal matrix. One or more power amplifiers may be included in the receiver circuit, the computing device(s), or both, in order to maintain or improve signal quality of the receiver coil signals. In the example of a wire connector providing digital signals, the receiver circuit may include an analog-to-digital converter (ADC) for converting the electrical current generated in the receiver coil into a digital signal for transmission over the cable.

The above examples generally describe a system that uses only electromagnetic tracking signals to determine PnO of a tracked object. However in other examples, the system may include additional sensors, such as gyroscopes, accelerometers, magnetometers, barometers, etc. (not shown). These additional sensors may be used to supplement the electromagnetic tracking signals, such as to improve an accuracy on the PnO determination. In some instances, the signals from the additional sensors may be transmitted to the system electronics over the same cable as the electronic signals from the electromagnetic receiver circuit. In such instances, the orientation of the cable may be determined based on the electronic signals from the electromagnetic receiver circuit. Once the orientation of the cable has been determined, it may then be determined which pins of the cable correspond to which signals of the additional sensors. For example, and with reference to FIG. 2, if positive and negative signals from an accelerometer are connected to pins A4 and A5 of the cable, and if positive and negative signals from a gyroscope are connected to pins B4 and B5, of the cable, then the particular pins of the connection port that receive the respective accelerometer and gyroscope signals may be reversed with one another if the cable is inserted into the connection port in a reversed orientation. By determining the orientation of the cable using the electromagnetic tracking signals, the identity of the accelerometer and gyroscope signals may be determined, and identified and processed appropriately by the one or more processors of the system electronics.

The example electromagnetic tracking devices, systems and methods described above may be useful in several applications, including head mounted displays (HMD), devices for surgical navigation (including simulations of surgical procedures), handheld or wearable devices for virtual reality or augmented reality programs, and more. Generally, and in the example of FIG. 1, the receiver circuit 120 is mounted to a tracked object 20, such as a user's helmet or a surgical device. The transmitter circuit 110 may mounted to a fixed platform 10, such as a tripod positioned close to the user, or to a frame of vehicle of the user for applications in which the user is travelling. Due to the reciprocal nature of electromagnetic tracking systems, an alternative configuration may involve the transmitter circuit 110 being mounted to the moving object 20 and the receiver circuit 120 being mounted to the fixed platform 10. In this manner, in those instances where connecting the computing device to the receiver circuit may be difficult for a receiver circuit mounted to the tracked object, it may be possible to instead mount the receiver circuit to the fixed object or vehicle frame.

The above example systems generally describe a wired connection between the receiver circuit and the system electronics. However, it should be recognized that other components of the system may also be communicatively connected to one another. For example, both the transmitter circuit 110 and the receiver circuit 120 may be connected to the one or more computing devices 130 in order to transmit and receive data with the computing devices 130. The connections may be wired, such as USB Type-C cables or other cables typically used in electromagnetic tracing systems, or wireless connections, including short range communication protocols such as near-field communication (NFC), WiFi, Bluetooth, Bluetooth LE. Additionally or alternatively, the transmitter circuit and the receiver circuit may be connected to one another in a wired or wireless manner in order to provide information therebetween, such as providing phase information from the transmitter to the receiver to avoid phase ambiguity of the electromagnetic field generated by the transmitter.

The above examples generally describe a system using a receiving coil array including coils in order to detect the magnetic field generated by the transmitter circuit and generate the electrical signals. However, in other examples, the receiver circuit may include an array of sensing elements other than coils. For example, the receiver circuit may include an array of Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An apparatus comprising:
   a port configured to receive a reversible connector comprising a plurality of pins, wherein the port includes a plurality of electrical connection points adapted to receive the plurality of pins of the reversible connector in either one of a first orientation or a second orientation; and
   a processor configured to receive electrical signals from the connection points of the port,
   wherein in the first orientation:
   a first connection point is adapted to receive a first pin;
   a second connection point is adapted to receive a second pin;
   a third connection point is adapted to receive a third pin; and
   a fourth connection point is adapted to receive a fourth pin,
   wherein in the second orientation:
   the first connection point is adapted to receive the second pin;
   the second connection point is adapted to receive the first pin;
   the third connection point is adapted to receive the fourth pin; and the fourth connection point is adapted to receive the third pin,
wherein the received electrical signals include:
a first electrical signal received from the first and second pins, the first electrical signal indicating a magnetic field sensed by a receiving sensor array along a first axis;
a second electrical signal received from the third pin, the second electrical signal indicating a magnetic field sensed by the receiving sensor array along a second axis; and
a third electrical signal received from the fourth pin, the third electrical signal indicating a magnetic field sensed by the receiving sensor array along a third axis, and
wherein the processor is further configured to determine whether the reversible connector is in the first orientation or the second orientation based on the received first, second and third electrical signals.

2. The apparatus according to claim 1, wherein the electrical signals received at the connection points of the port are analog signals, and wherein the apparatus comprises one or more amplifiers configured to amplify the electrical signals.

3. The apparatus according to claim 1, wherein the electrical signals received at the connection points of the port are digital signals.

4. The apparatus according to claim 1, wherein the receiving sensor array is configured to detect a magnetic field from a transmitting coil array to derive a set of components of the magnetic field generated by the transmitting coil array, and wherein the processor is configured to:
form a matrix of the set of components derived from the magnetic field based on the received first, second and third electrical signals;
calculate a determinant of the matrix; and
determine whether the reversible connector is in the first orientation or the second orientation based on whether the determinant is positive or negative.

5. The apparatus according to claim 4, wherein the processor is configured to assign data received at the third and fourth connection points based on the determination of whether the reversible connector is in the first orientation or the second orientation.

6. The apparatus according to claim 5, wherein the processor is configured to assign data received at additional connections points of the port based on the determination of whether the reversible connector is in the first orientation or the second orientation.

7. The apparatus according to claim 6, wherein the assigned data received at the additional connections includes one or more of: acoustic signal data; gyroscope signal data; optical signal data; accelerometer signal data; barometer signal data; and magnetometer signal data.

8. An electromagnetic tracking system comprising:
a transmitter including a plurality of transmitter coils and an actuating circuit configured to actuate the transmit coils at different times or at different frequencies;
a receiver including a plurality of receiver coils, each receiver coil configured to receive a respective component of a magnetic field generated by each of the transmitter coils, and to generate a plurality of respective electrical signals corresponding to each received component of the magnetic field;
a processor configured to determine each of a position and an orientation of the receiver relative to the transmitter based on an analysis of the plurality of electrical signals generated by the receiver; and
a wired connection configured to deliver the plurality of electrical signals from the receiver to the processor, the wired connection including a reversible connector, wherein the processor is configured to determine an orientation of the reversible connector based on the analysis of the plurality of electrical signals.

9. A system comprising:
the electromagnetic tracking system according to claim 8; and
an object attached to one of the transmitter or the receiver of the electromagnetic tracking system, wherein the electromagnetic tracking system is configured to track a position and orientation of the object, wherein the object is one of a handheld device, a wearable device, or a head mounted display.

10. The electromagnetic tracking system according to claim 8, wherein the plurality of respective electrical signals are analog signals, and wherein the electromagnetic tracking system comprises one or more amplifiers configured to amplify the plurality of respective electrical signals.

11. The electromagnetic tracking system according to claim 10, further comprising an analog to digital converter configured to convert the analog signals to digital signals, wherein the processor is configured to analyze the digital signals.

12. The electromagnetic tracking system according to claim 8, wherein the reversible connector has a second order rotational symmetry.

13. The electromagnetic tracking system according to claim 12, wherein the reversible connector is a USB-C connector.

14. The electromagnetic tracking system according to claim 8, wherein the processor is configured to:
form a matrix of the plurality of respective electrical signals;
calculate a determinant of the matrix; and
determine the orientation of the reversible connector based on the determinant of the matrix.

15. The electromagnetic tracking system according to claim 14, wherein the processor is configured to:
for first and second pins of the reversible connector having second order rotational symmetry with one another, assign a row or column of the matrix to the first pin and a second row or column of the matrix to the second pin;
if the determinant of the matrix is positive, maintain the assigned rows or columns of the first and second pins; and
if the determinant of the matrix is negative, switch the assigned rows or columns of the first and second pins with one another.

16. The electromagnetic tracking system according to claim 15, wherein the processor is configured to:
for third and fourth pins of the reversible connector having second order rotational symmetry with one another, assign a first data type to the third pin and a second data type to the second pin;
if the determinant of the matrix is positive, maintain the assigned data types of the third and fourth pins; and
if the determinant of the matrix is negative, switch the assigned data types of the third and fourth pins with one another.

17. The electromagnetic tracking system according to claim 16, wherein the first data type and the second data type are different ones of: acoustic signal data; gyroscope signal data; optical signal data; accelerometer signal data; barometer signal data; and magnetometer signal data.

18. A method for determining an orientation a reversible connector comprising a plurality of pins, wherein first and second pins of the reversible connector are mirrored to one another and are configured to transmit a same first signal, and wherein third and fourth pins of the reversible connector are mirrored to one another and are configured to transmit a second signal and a third signal, respectively, wherein each of the first, second and third signals indicate properties of a magnetic field sensed by a receiving sensor array along respective axes, the method comprising:

receiving, at a processor, the first, second and third signals; and determining, at the processor, the orientation of the reversible connector based on an analysis of the first, second and third signals.

19. The method according to claim 18, further comprising assigning, at the processor, respective axes to each of the second and third signals based on the determined orientation of the reversible connector.

20. The method according to claim 19, further comprising assigning, at the processor, signal data types to data received from other pins of the reversible connector based on the determined orientation of the reversible connector.

* * * * *